Feb. 1, 1938.  J. F. LEVENTHAL ET AL  2,107,039
RIBBON FEEDING MECHANISM
Filed Sept. 27, 1934  2 Sheets-Sheet 1
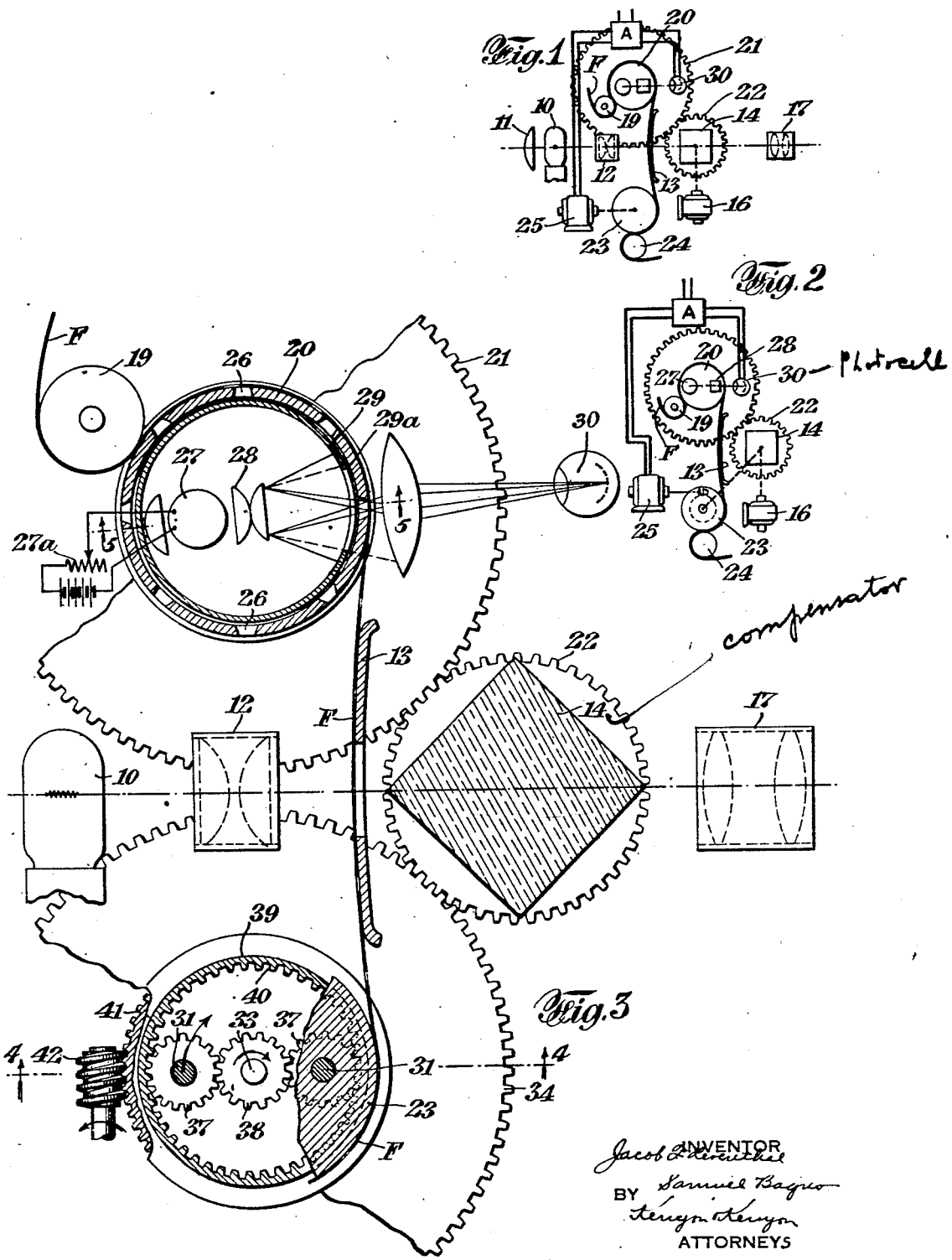

Feb. 1, 1938.     J. F. LEVENTHAL ET AL     2,107,039
RIBBON FEEDING MECHANISM
Filed Sept. 27, 1934     2 Sheets-Sheet 2
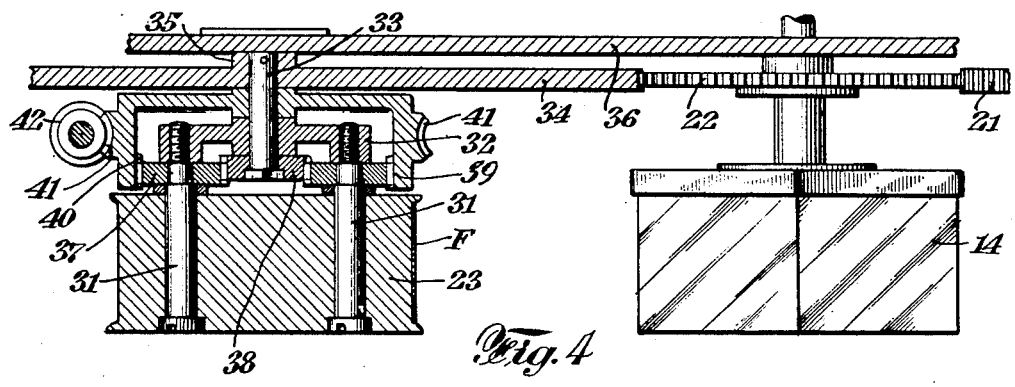
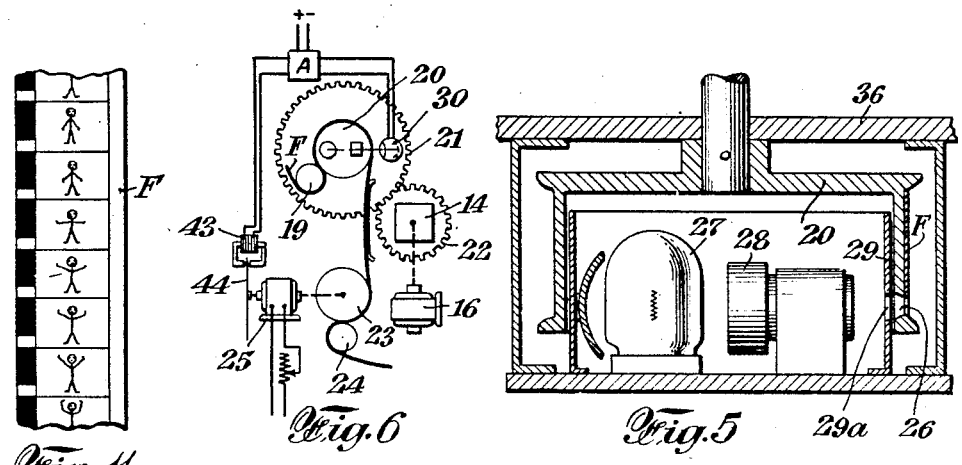
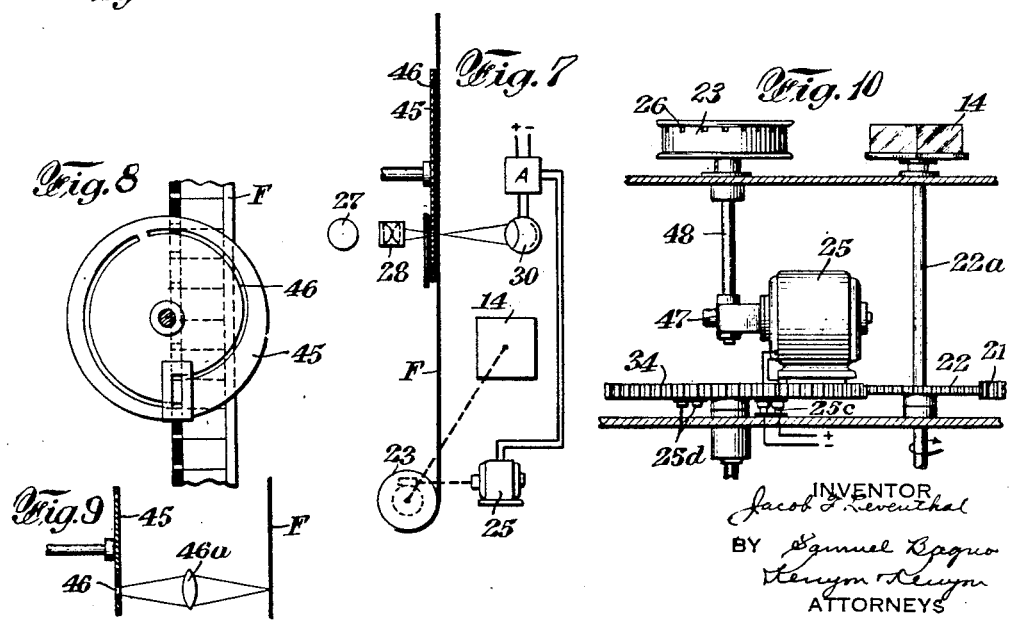

Patented Feb. 1, 1938

2,107,039

UNITED STATES PATENT OFFICE 2,107,039

RIBBON FEEDING MECHANISM

Jacob F. Leventhal and Samuel Bagno, New York, N. Y., assignors to Leventhal Patents, Inc., New York, N. Y., a corporation of Delaware Application September 27, 1934, Serial No. 745,683

10 Claims. (Cl. 88—16.8)

This invention relates to motion picture apparatus and more especially to film feeding devices therefor.

At present, motion picture film is customarily provided with perforations which cooperate with sprocket teeth of feeding mechanism operated to feed the film at a constant picture rate. In some types of film feeding mechanism, the perforations are engaged by the teeth of an intermittent pull-down sprocket or claw mechanism as well as by the teeth of a regulating sprocket, while in other types of feeding mechanism perforations are engaged only by the teeth of the regulating sprocket. Sprocket feeding has the undesirable feature for continuous film feed apparatus and sound-on-film apparatus that there is always a lack of perfect correspondence between the pitch of the sprocket teeth and the pitch of the film perforations. The film, therefore, is not fed at uniform velocity, but rather at slightly irregular velocity. This lack of correspondence is due to film shrinkage and increases with the extent of film shrinkage with consequent increase in the irregular velocity of the film. The ideal condition of uniform velocity of film feed cannot be realized by sprocket feeding.

An object of this invention is a film feeding mechanism which insures substantially constant film velocity at a definite picture rate.

According to the present invention, the film is provided along one edge with alternate light transmitting and light obstructing areas. Such film is fed between a light sensitive element and a light source and movable means are provided to cooperate with the light transmitting and light obstructing areas to control the amount of light transmitted from the light source to the light sensitive element. The movable means is operated at a predetermined speed governed by the picture rate of the apparatus and the film is fed by means controlled as to speed by the light sensitive element. By this mechanism, the velocity of the film feed is maintained substantially constant and the film is fed at a definite predetermined picture rate. Such film feeding mechanism is particularly adapted for continuous-type projectors and for intermittent projectors of the "beater" or similar type feed.

Other objects, novel features and advantages of this invention will become apparent from the following specification and accompanying drawings, wherein:

Fig. 1 is a diagrammatic illustration of a continuous type projector equipped with film feeding means embodying the invention;

Fig. 2 is a similar view of a continuous type projector equipped with a modified form of film feeding means embodying the invention;

Fig. 3 is a vertical section through film feeding mechanism of the type diagrammatically illustrated in Fig. 2;

Fig. 4 is a section on the line 4—4 of Fig. 3;

Fig. 5 is a section on the line 5—5 of Fig. 3;

Fig. 6 is a diagrammatic illustration of a modified embodiment of the invention;

Fig. 7 is a diagrammatic view of a further modification of the invention;

Fig. 8 is a fragmentary elevation of Fig. 7;

Fig. 9 is a fragmentary view similar to Fig. 7 of a modification thereof;

Fig. 10 is a diagrammatic sectional view of a further modification; and

Fig. 11 is a plan view of a section of film for use with the film feeding mechanism.

Referring now more especially to Figs. 1 to 3 inclusive, 10 is a light source, 11 the reflector therefor, and 12 the condenser lens which directs a beam of light through the film gate 13 to a rotatable optical compensator 14. Both in this figure and in the succeeding figures, the compensator 14 may be of any of the known devices operative, when rotated in timed relation to a continuously moving film, to produce stationary screen images of pictures on the film. It is specifically shown as a refractor having two pairs of plane parallel faces and operative to compensate four pictures for each revolution thereof. Means later to be described are provided for feeding the film at the rate of four pictures for each rotation of the compensator. Each compensation cycle comprises rotation of the compensator through one quarter revolution. With a compensator having a different number of faces, the number of film pictures compensated per revolution and the extent of rotation of the compensator for a compensating cycle would be correspondingly varied. The compensator 14 is driven by a motor 16 and lens 17 serves in the usual way to project the picture to the usual screen. The film F passes between a guide roller 19 and an obturator or control drum 20 which is rotatable with a gear wheel 21 which meshes with a gear wheel 22 rotatable with the compensator 14. From the drum 20, the film F passes through the film gate 13 and between friction rollers or drums 23 and 24, the drum 23 being driven by a motor 25.

The film F (see Fig. 11) may be unperforated, but is provided along one edge with alternating light transmitting and light obstructing areas.

The drum 20 (see Fig. 3) is provided with a series of equally spaced apertures of the same height as the transmitting areas of the film and are adapted to register with said areas. The distance between center lines of successive apertures 26 is slightly less than the distance between center lines of successive light transmitting areas of maximum shrunk film.

Within the drum 20 is arranged a light source 27, a condenser lens 28, and shield 29 having an aperture 29a of substantially the same height as a picture frame. Exterior of the drum there is provided a light sensitive element or photoelectric cell 30 which receives light from the source 27 through an aperture 26. The photoelectric cell 30 is connected to a power amplifier A, the output of which is connected to the motor 25 and is effective to vary the speed of the motor 25 in a manner later to be described.

In the apparatus disclosed in Figs. 2 to 4 inclusive, the drum 23 is carried by bolts 31 threaded into a spider 32 rotatably mounted on a shaft 33 which extends through and is keyed to a gear wheel 34 having a hub 35 journaled in the frame 36 of the apparatus. On each bolt 31 is rotatably mounted a pinion 37, both of which mesh with a pinion 38 fixed to the shaft 33. A disk 39 is provided with a cylindrical flange having internal teeth 40 meshing with the pinions 37 and external teeth 41 meshing with a worm 42 driven by the motor 25. The gear wheel 34 meshes with the gear wheel 22 fixed to the shaft on which the compensator 14 is mounted.

The relation between the gears 21 and 22 and the number and spacing of the apertures 26 is such that one aperture passes between the light source 27 and the photo-electric cell 30 for each compensation cycle of the compensator 14. The diameter of the drum 20 is such that the surface speed thereof is slightly less than the linear speed of maximum shrunk film fed at the rate of one picture per compensation cycle. The drum 23 is operated at the proper speed under control of the photo-electric cell to feed the film at the rate of one picture per compensation cycle.

The drum 23 draws the film through the film gate and around the drum 20 so that as each aperture 26 approaches the edge of the aperture 29a a transparency on the film registers to some extent with the aperture, thus regulating the amount of light transmitting to the photo-electric cell. If the film speed is too slow the registration will be small and the amount of light passing to the photo-electric cell will be correspondingly small. The photo-electric cell thereupon decreases the speed of the motor 25 to decrease the speed of the drum 23 sufficient to correct the condition. If the film speed is too high, the registration will be great and the amount of light passing to the photo-electric cell will be correspondingly great. The photo-electric cell thereupon increases the speed of the motor 25 to increase the speed of the drum 23 sufficient to correct the condition. The relationship between the drum apertures 26 and the film transparencies has the same effect as sprocket teeth and perforations with respect to obtaining framing of the picture. The film will always be advanced exactly one picture frame for each compensation cycle and accurate framing will result. At starting, even though no registration exists, the desired condition will automatically be arrived at after a short running time.

In the arrangement disclosed in Figs. 2 to 4 inclusive, primary rotation of the drum 23 is effected by the motor 16 through the gear train composed of gear 22, gear 34, shaft 33, pinion 38, pinions 37 and internal ring gear 40 and secondary rotation of either additive or subtractive nature is effected by the motor 25 through the worm 42, worm gear 41 and internal ring gear 40. Relationship of the gears in the gear train above specified is such that with the disk 39 stationary the drum 23 would be rotated more slowly than would be required to feed the film at the desired rate of one picture per compensation cycle. The motor 25 is, therefore, always driving the disk 39 and variation of its speed effects regulation of the speed of the drum 23.

In the arrangement shown in Fig. 1, the speed of the drum 23 is completely unrelated inherently to the compensator speed. Therefore, the corrections effected by the governor drum pertain to the speed of the feed drum 23 as a whole. Thus, if the correcting system has a plus or minus tolerance of say 2%, the final error will be a 2% error, whereas in the arrangement shown in Figs. 2 to 4 inclusive, the final error would be only a fraction of the tolerance error.

The modification disclosed in Fig. 6 relies upon the use of an electro-magnetic brake to regulate the film speed. In this modification, the motor 16 drives the compensator 14, which is in turn geared to the gear wheel 21 which carries the governor drum 20. The feed drum 23 is driven by a motor 25 which tends to drive the feed drum at too high a speed. The photo-electric cell 30 is connected with the field winding of an electro-magnet 43, the poles of which receive between themselves the iron disk 44 mounted on the armature shaft of the motor 25.

The film F passes around the guide roller 19 and over the governor drum 20 as before and controls the passage of light to the photo-electric cell 30 as previously described. When the film F runs too fast; the photo-electric cell is effective to increase the strength of the electro-magnetic brake and thus slow down the motor 25 to the proper speed required to effect feeding of the film at the rate of one picture per compensation cycle.

The arrangement disclosed in Figs. 7 and 8 is a modification of the arrangement disclosed in Figs. 2 to 4 inclusive, in which the governing drum 20 is replaced by a governing disk 45 having a spiral slot 46 which is adapted to register with the transparencies in the film F. The slot 46 is equal in width to the height of the transparencies and the ends of the center line of the slot are offset from each other by a distance slightly less than the space between the center lines of transparencies of a maximum shrunk film. The disk 45 is arranged to rotate once for each compensation cycle and the amount of registration of the slot 46 with a film transparency depends upon the relative speeds of the film and the disk. If the film is traveling too fast, the passage of light to the photo-electric cell is varied to cause the motor 25 to be slowed down to remedy the condition and if the film is traveling too slowly, the reverse action is effected.

In the modification disclosed in Fig. 10, the compensator 14 and the gear 22 are mounted on a shaft 22a driven by the motor 16 (not shown). The gear 22 meshes with the gear 21 and with the gear 34 on which is mounted the motor 25. The armature shaft of the motor 25 is connected through suitable reduction gearing 47 with a shaft 48 coaxial with the gear 34. The drum 23 is mounted on the shaft 48. Energizing current is supplied to the motor 25 by way of stationary brushes 25c and rings 25d carried by the gear 34, the energizing current being controlled by the photo-electric cell 29 (not shown).

In this modification, the drum 23 draws the film through the film gate 13 and over the drum 20 which are not shown in this figure but which are the same as in Fig. 3. Primary rotation of the drum 23 is effected by bodily rotation of the motor 25 about the axis of the shaft and secondary rotation is effected by rotation of the armature of the motor 25, thus causing differential rotation of the shaft 48 with respect to the gear 34. The relationship of the gears 22 and 34 is such that with the armature shaft stationary, the drum 23 would be rotated more slowly than would be required to feed the film at the desired rate of one picture per compensation cycle. The motor 25 is, therefore, always relied upon to rotate the shaft 48 with respect to gear 34 and variation of its speed effects regulation of the speed of the drum 23. The rate of rotation of the armature shaft is controlled by the photo-electric cell and the film feed velocity is thus regulated. It is evident that in the modification disclosed in Fig. 10, there will be less gear shake or gear vibration than in the modification disclosed in Figs. 1 to 4 inclusive.

The circuit for the exciter lamp 27 may be provided with a rheostat 27a as shown in Fig. 3 to permit variation in the current supplied to the lamp either to compensate for decrease in brightness of the lamp from deterioration or to compensate for any change of electrical characteristics of the control and/or operating circuits.

Although the invention has been disclosed as embodied in a projector, it is evident that it may equally well be embodied in any motion picture apparatus of the picture cycle type such for example as a camera and it is intended that the claims shall cover all apparatus of this type as well as projectors. In the claims, the film feeding member is designated a drum to distinguish from a toothed member such as a sprocket and it is intended to cover both cylindrical and frusto-conical members by this term.

Fig. 9 illustrates a modification of Figs. 7 and 8 in which the disk 45 is arranged in a plane removed from the film plane and the required registration of the slot 46 and light transmitting areas of the film F is obtained by optical imagery through the medium of a lens 46a.

We claim:

1. In a ribbon feeding apparatus comprising a radiation emitting element, a radiation sensitive element associated therewith, a rotatable control unit having a series of radiation transmitting areas adapted to pass between said radiation emitting and radiation sensitive elements, and a shield for limiting transmission of radiations to a single control unit transmission area; means including a rotatable feed unit for passing between said elements in operative relation to said control unit a ribbon having a longitudinal row of alternating radiation transmitting and radiation obstructing areas, a rotatable member, an electric motor responsive to said radiation sensitive element mounted thereon, one unit having a shaft coaxial with said member, driving connections between said motor and said shaft, and means for rotating said member and the other unit in predetermined speed.

2. In a ribbon feeding apparatus comprising a radiation emitting element, a radiation sensitive element associated therewith, a rotatable control unit having a series of radiation transmitting areas adapted to pass between said radiation emitting and radiation sensitive elements, and a shield for limiting transmission of radiations to a single control unit transmission area; means including a rotatable feed unit for passing between said elements in operative relation to said control unit a ribbon having a longitudinal row of alternating radiation transmitting and radiation obstructing areas, a rotatable member, a pinion rotatable with said member, means rotatably supporting one unit on said member, a pair of gears rotatably attached to said unit and meshing with said pinion, a ring rotatably mounted on said member and having teeth in mesh with said gears, means responsive to said radiation sensitive element for rotating said ring and means for rotating said member and the other unit in predetermined speed relation.

3. In motion picture apparatus, the combination with a rotatable optical compensator of a radiation emitting element, a radiation sensitive element associated therewith, a rotatable control unit having a series of radiation transmitting areas adapted to pass between said radiation emitting and radiation sensitive elements, means including a rotatable feed unit for passing between said elements in operative relation to said control unit and in operative relation to said optical compensator film having a longitudinal row of alternating radiation transmitting and radiation obstructing areas adapted to register with said control unit transmission areas, a shield for limiting transmission of radiations to a single control unit transmission area, primary means for rotating said control unit and feed unit in predetermined speed relation to said compensator, and secondary means responsive to said radiation sensitive element connected between said primary means and one of said units for varying the speed relation between one of said units and said compensator.

4. In motion picture apparatus the combination with a rotatable optical compensator of a radiation emitting element, a radiation sensitive element associated therewith, a rotatable control unit having a series of radiation transmitting areas adapted to pass between said radiation emitting and radiation sensitive elements, means including a rotatable feed unit for passing between said element in operative relation to said control unit and in operative relation to said optical compensator film having a longitudinal row of alternating radiation transmitting and radiation obstructing areas adapted to register with said control unit transmission areas, a shield for limiting transmission of radiations to a single control unit transmission area, a rotatable member on which one unit is rotatably mounted, means responsive to said radiation sensitive element for effecting rotation of said unit relative to said member, and means for rotating said member and the second unit in predetermined speed relation to said compensator.

5. In motion picture apparatus, the combination with a rotatable optical compensator of a radiation emitting element, a radiation sensitive element associated therewith, a rotatable control unit having a series of radiation transmiting areas adapted to pass between said radiation emitting and radiation sensitive elements, means including a rotatable feed unit for passing between said element in operative relation to said control unit and in operative relation to said optical compensator film having a longitudinal row of alternating radiation transmitting and radiation obstructing areas adapted to register with said control unit transmission areas, a shield for limiting transmission of radiations to a single control unit transmission area, a rotatable member, an electric motor responsive to said radiation sensitive element mounted thereon, one unit having a shaft coaxial with said member, driving connections between said motor and said shaft, and means for rotating said member and the second unit, in predetermined speed relation to said compensator.

6. In motion picture apparatus, the combination with a rotatable optical compensator of a radiation emitting element, a radiation sensitive element associated therewith, a rotatable control unit having a series of radiation transmitting areas adapted to pass between said radiation emitting and radiation sensitive elements, means including a rotatable feed unit for passing between said element in operative relation to said control unit and in operative relation to said optical compensator film having a longitudinal row of alternating radiation transmitting and radiation obstructing areas adapted to register with said control unit transmission areas, a shield for limiting transmission of radiations to a single control unit transmission area, a rotatable member, a pinion rotatable with said member, means rotatably supporting one unit on said member, a pair of gears rotatably attached to said unit and meshing with said pinion, a ring rotatably mounted on said member and having teeth in mesh with said gears, means responsive to said radiation sensitive element for rotating said ring, and means for rotating said member and the second unit in predetermined speed relation to said compensator.

7. In motion picture apparatus according to claim 3, a control unit comprising a cylinder surrounding one of said elements and having a series of peripheral radiation transmitting areas.

8. In motion picture apparatus according to claim 4, a control unit comprising a cylinder surrounding one of said elements and having a series of peripheral radiation transmitting areas.

9. In motion picture apparatus according to claim 5, a control unit comprising a cylinder surrounding one of said elements and having a series of peripheral radiation transmitting areas.

10. In motion picture apparatus according to claim 6, a control unit comprising a cylinder surrounding one of said elements and having a series of peripheral radiation transmitting areas.

JACOB F. LEVENTHAL.
SAMUEL BAGNO.